G. H. PADGETT.
TRANSMISSION CASE.
APPLICATION FILED JUNE 18, 1919.

1,351,680.

Patented Aug. 31, 1920.
2 SHEETS—SHEET 1.

WITNESSES

INVENTOR
G. H. PADGETT
BY
ATTORNEYS

G. H. PADGETT.
TRANSMISSION CASE.
APPLICATION FILED JUNE 18, 1919.
1,351,680.
Patented Aug. 31, 1920.
2 SHEETS—SHEET 2.
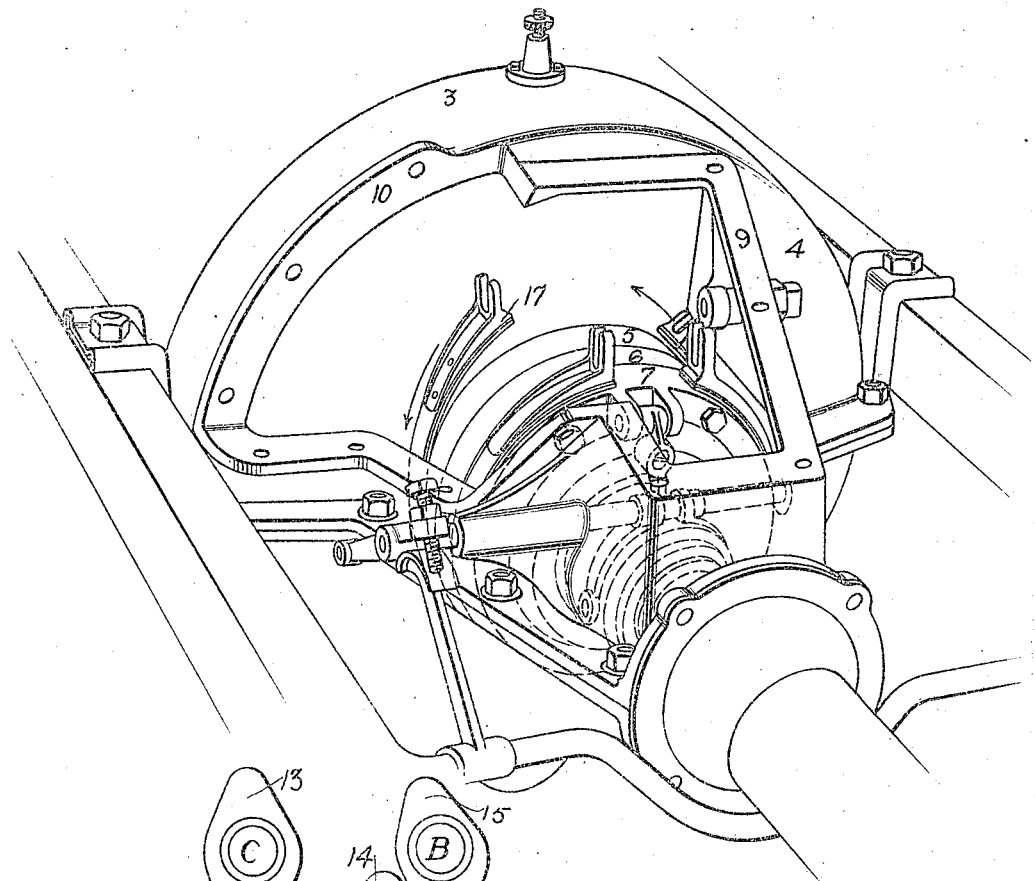
Fig. 3.
Fig. 4.
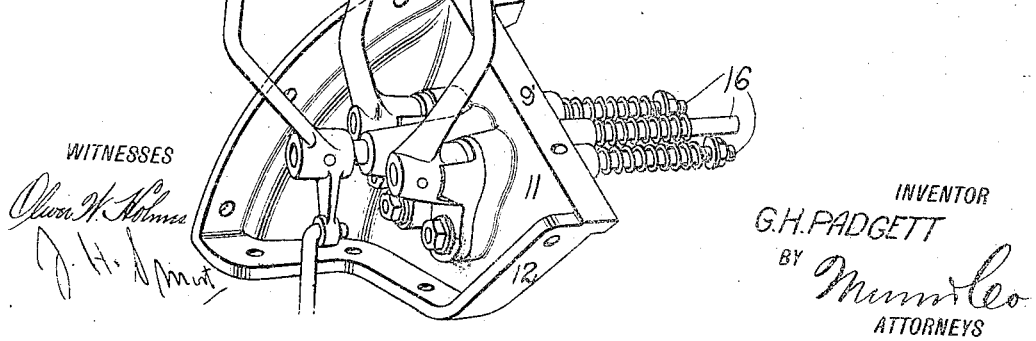
WITNESSES
INVENTOR
G. H. PADGETT
BY
ATTORNEYS

UNITED STATES PATENT OFFICE.

GEORGE H. PADGETT, OF OTISVILLE, NEW YORK.

TRANSMISSION-CASE.

1,351,680.          Specification of Letters Patent.     Patented Aug. 31, 1920.

Application filed June 18, 1919.  Serial No. 305,028.

*To all whom it may concern:*

Be it known that I, GEORGE H. PADGETT, a citizen of the United States, and a resident of Otisville, in the county of Orange and State of New York, have invented a new and Improved Transmission-Case, of which the following is a full, clear, and exact description.

This invention relates to a transmission case, and aims to provide a case constructed in such a manner that certain parts of the mechanism heretofore inaccessible may be readily reached.

It is a well-known fact, in connection with transmission cases, that in automobiles of the Ford type the services of two men are required for renewing the reverse band, slow-speed band and brake band. Further, the entire rear part of the transmission casing must be removed, resulting in the destruction of the oil-proof gaskets, so as to render the transmission accessible, subsequent to which the bands may be removed, relined and reapplied to the driving and brake plates. This operation, as aforestated, requires the services of two men, due to the inaccessibility of the various bolts and the weight of the transmission case; and, further, when such case is returned to its original position, the new gasket, which will have to be provided to prevent the leakage of oil, will in most instances become mutilated, resulting in a leakage of oil.

I aim to provide a transmission case having associated with it structure which will render it possible for access to be had to the transmission without the destruction of the gasket aforementioned, and with which the entire operation may be completed by one man in a fraction of the time required heretofore by two men. Further, the work is rendered far less disagreeable, in view of the fact that it will not be necessary for an operator to lie underneath the car.

Reference is had to the accompanying drawings which illustrate one practical embodiment of my invention, and in which—

Fig. 3 is an elevational view of a transmission case with the structure which I propose to utilize associated therewith; and Fig. 4 is an elevational view of the control pedals supported upon a removable portion of such transmission case.

Figure 1:
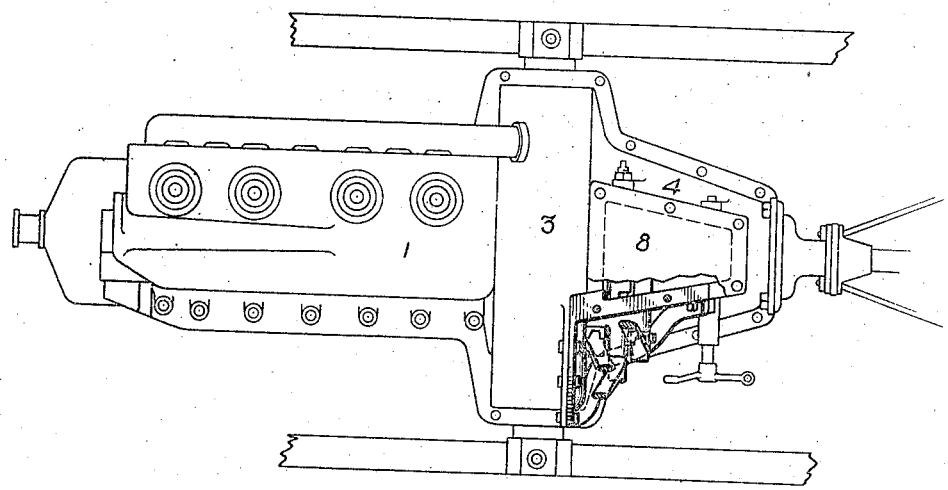
Figure 1 is a plan view of an engine of the Ford type with a transmission case applied thereto.
Figure 2:
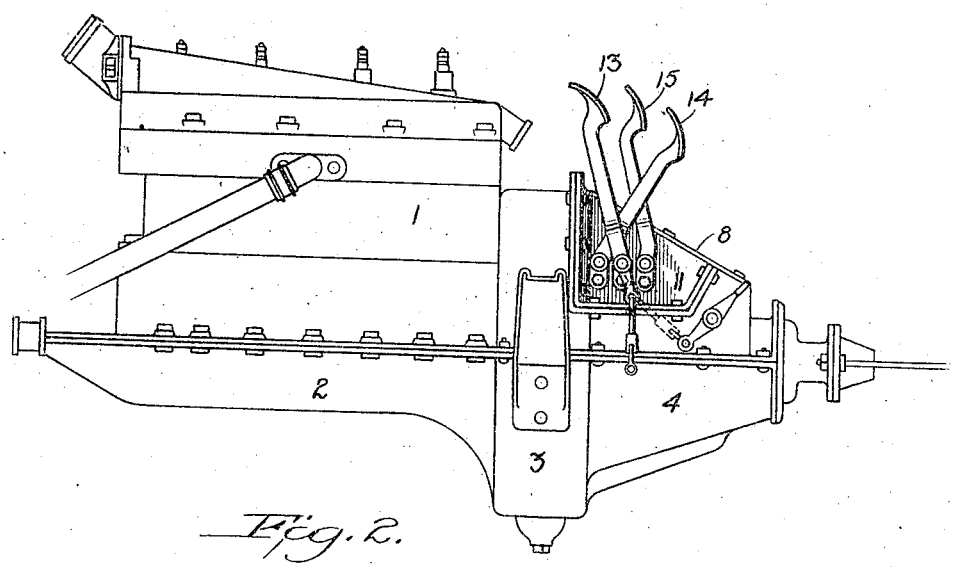
Fig. 2 is a side view thereof.

In all of these views like reference numerals designate similar parts, and the reference numeral 1 indicates an engine of the Ford type provided on its lower side with an oil pan 2 terminating in a fly-wheel casing 3 to the rear of which is positioned the conventional transmission case 4.

The transmission case, as is well known, houses a transmission, including a reverse plate 5, slow-speed plate 6 and brake plate 7, which are encircled by a reverse band, slow-speed band, and brake band, respectively.

In the conventional structure, a removable plate, such as 8, is applied to the upper surface of the transmission case, which is correspondingly cut away, the portions of such case adjacent the edges of the cut being flattened, as indicated by the reference numeral 9, so that a tight fit may be accomplished between the transmission case and the removable plate 8. According to my invention, I cut away the entire forward left-hand side of the transmission casing and flange the edges of such cut, as indicated by the reference numeral 10. A removable plate 11 is formed so as to correspond to the latter cut-away portion of the transmission case, the upper edge of such plate being flanged, as indicated by the reference numeral 9', so as to form a continuation when in applied position, of the flange 9 of the casing 4. The side and lower edges of the plate 11 are also flanged, as indicated by the reference numeral 12, so as to correspond to the flange 10 of the cut-away portion of the case. As will be noted, all of these flanges, plates and covers are formed with openings through which are adapted to pass bolts provided with nuts for securing all the parts in correct position. The clutch 13, reverse 14, and brake pedals 15, are mounted upon the plate 11 by means of their associated shafts 16 which project therethrough and act upon the reverse, slow-speed, and brake bands in the conventional manner.

It will now be seen that the plate 8 may readily be removed for inspecting the interior of the transmission case and applying thereto grease, etc. Should it now be desired to reline the bands, instead of having to remove the entire transmission case, or even, in fact, the motor in its entirety, if assurance is to be had that the gasket has not been damaged, the plate 11 may readily be disengaged from the transmission case by loosening the bolts extending through the bands formed in the flange 12 and its corresponding flange 10, and any band, as indicated by the reference numerals 17, attention being had to Fig. 1, may be slipped out from around its corresponding plate.

It is to be understood that any number of modifications may be resorted to without in the least departing from the scope of my invention, such, for instance, as altering the shape of the plate 11, rearranging the flanges upon such plate, etc.

Having thus described my invention, I desire to claim:

1. A transmission case, including a case formed with a substantially square conventional opening through its upper face, such opening being formed around three of its sides with a flange, such case being formed with a further opening to one side of and in communication with such first-named opening and communicating with the same, such second opening having its edges flanged, and a plate adapted to seat within such second-named opening, the upper edge of such plate being flanged, and when in applied position forming a continuation of the flange around the first-named opening whereby the plate therefor may seat properly.

2. A transmission case, including a case formed with a conventional opening through its upper face and being further provided with an opening to one side of and in communication with such first-named opening, plates for such first- and last-named openings, and controls for such transmission mounted upon the second-named plate.

GEORGE H. PADGETT.